(12) United States Patent
Cross et al.

(10) Patent No.: US 7,654,535 B2
(45) Date of Patent: Feb. 2, 2010

(54) NON-CONTACTING FACE SEALS AND THRUST BEARINGS

(75) Inventors: Rodney Alan Cross, Bath (GB); Raymond Frederick Sargent, Thornbury Bristol (GB); Edward Henry Cross, Bath (GB)

(73) Assignee: Cross Manufacturing Company (1938) Limited, Avon (GB)

( * ) Notice: Subject to any disclaimer, the term of this patent is extended or adjusted under 35 U.S.C. 154(b) by 209 days.

(21) Appl. No.: 10/565,172

(22) PCT Filed: Jul. 12, 2004

(86) PCT No.: PCT/GB2004/003012

§ 371 (c)(1),
(2), (4) Date: Jan. 19, 2006

(87) PCT Pub. No.: WO2005/015064

PCT Pub. Date: Feb. 17, 2005

(65) Prior Publication Data

US 2006/0171617 A1 Aug. 3, 2006

Related U.S. Application Data

(60) Provisional application No. 60/488,802, filed on Jul. 22, 2003.

(30) Foreign Application Priority Data

Jul. 22, 2003 (GB) .................................. 0317055.2

(51) Int. Cl.
*F16J 15/34* (2006.01)
*F16C 32/06* (2006.01)

(52) U.S. Cl. ........................ 277/403; 277/400; 277/411; 384/122; 384/124

(58) Field of Classification Search ................. 277/400, 277/403, 411; 384/122, 124
See application file for complete search history.

(56) References Cited

U.S. PATENT DOCUMENTS 2,137,487 A 11/1938 Hall (Continued)

FOREIGN PATENT DOCUMENTS

DE 3734888 4/1989

(Continued)

OTHER PUBLICATIONS

British Search Report dated Jul. 3, 2009.

*Primary Examiner*—Alison K Pickard
(74) *Attorney, Agent, or Firm*—Young & Thompson

(57) ABSTRACT

The apparatus, which can be used in aspirating face seals or thrust bearings, spaces two relatively rotatable facing surfaces in use by entraining gas between the surfaces. The apparatus includes a first portion (1) defining a generally frusto-conical surface (3); a second portion (2) defining at least one flat surface disposed adjacent the first portion so that the two surfaces face each other and define at least one point of closest engagement between the surfaces, with diverging gaps extending between the surfaces on either side of a plane which contains the point or points of closest engagement and which extends generally orthogonal to the direction of relative rotation, and a device (4) for biasing the flat surface towards the frusto-conical surface to maintain the gaps within a predetermined dimensional range.

23 Claims, 6 Drawing Sheets

U.S. PATENT DOCUMENTS

| | | | | |
|---|---|---|---|---|
| 2,814,512 | A | * | 11/1957 | Quinn et al. ............... 277/388 |
| 3,499,653 | A | * | 3/1970 | Gardner .................... 277/362 |
| 3,529,838 | A | * | 9/1970 | Singleton ................. 277/388 |
| 3,813,086 | A | | 5/1974 | Ebner et al. |
| 3,869,963 | A | | 3/1975 | Schindel |
| 3,871,099 | A | | 3/1975 | Kahn |
| 3,905,606 | A | * | 9/1975 | Florjancic ................. 277/388 |
| 3,945,777 | A | | 3/1976 | Labus |
| 4,007,974 | A | | 2/1977 | Huber |
| 4,331,337 | A | | 5/1982 | Cross et al. |
| 4,373,535 | A | | 2/1983 | Martell |
| 4,375,891 | A | | 3/1983 | Pask |
| 4,426,087 | A | | 1/1984 | Sargent et al. |
| 4,426,161 | A | | 1/1984 | Gabriel et al. |
| 4,461,612 | A | | 7/1984 | Dodd |
| 4,738,453 | A | * | 4/1988 | Ide ........................... 277/400 |
| 4,747,752 | A | | 5/1988 | Somarakis |
| 4,884,945 | A | | 12/1989 | Boutin et al. |
| 5,222,742 | A | | 6/1993 | Roberts |
| 5,224,714 | A | * | 7/1993 | Kimura et al. ............. 277/400 |
| 5,246,295 | A | * | 9/1993 | Ide ........................... 384/124 |
| 5,399,024 | A | | 3/1995 | Shapiro |
| 5,499,824 | A | * | 3/1996 | Salant ....................... 277/400 |
| 5,531,457 | A | | 7/1996 | Tibbott et al. |
| 5,558,341 | A | | 9/1996 | McNickle et al. |
| 5,609,342 | A | * | 3/1997 | Peterson et al. ........... 277/399 |
| 5,975,537 | A | | 11/1999 | Turnquist et al. |
| 6,435,822 | B1 | | 8/2002 | Kobayashi et al. |
| 2002/0047239 | A1 | | 4/2002 | Auber |
| 2006/0171617 | A1 | | 8/2006 | Cross et al. |

FOREIGN PATENT DOCUMENTS

| | | |
|---|---|---|
| DE | 3 836 956 | 5/1990 |
| DE | 39 42 408 A1 | 5/1991 |
| EP | 0 571 791 | 12/1993 |
| EP | 0 571 791 A1 | 12/1993 |
| EP | 0 803 668 | 10/1997 |
| EP | 0875683 | 11/1998 |
| EP | 0 995 933 | 4/2000 |
| EP | 1 122 472 | 8/2001 |
| EP | 1 270 950 | 1/2003 |
| FR | 2 113 492 | 6/1972 |
| FR | 0 581 681 | 2/1994 |
| GB | 2050278 | 1/1981 |
| GB | 2076474 | 12/1981 |
| GB | 2109871 | 6/1983 |
| JP | 55-119219 | 9/1980 |
| JP | 7035242 | 2/1995 |
| RU | 2104716 | 2/1998 |
| WO | WO99/63224 | 12/1999 |
| WO | WO 2005/015064 A1 | 2/2005 |

\* cited by examiner

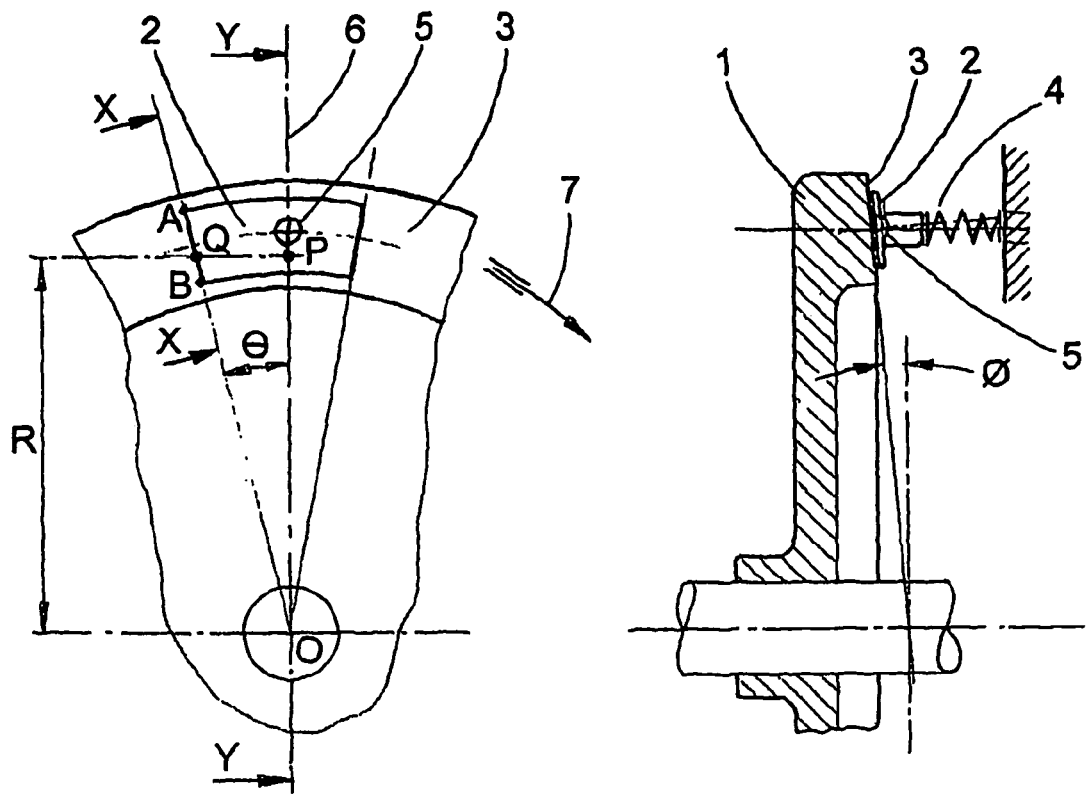
Fig. 1
Fig. 2
(SECTION YY)
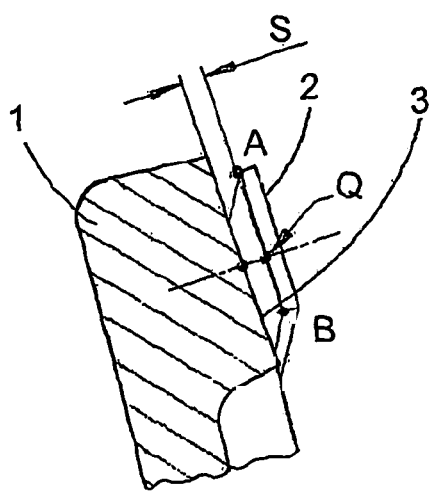
Fig. 3
(SECTION XX)

NON-CONTACTING FACE SEALS AND THRUST BEARINGS

FIELD OF THE INVENTION

Self aspirating seals can be used for partial sealing against the leakage of gases between the rotating and static assemblies of an engine. The sealing members are prevented from coming into physical contact by the inter-position of a pressurised film of gas, the pressure being self generated by the relative rotational velocity between the sealing members.

In an alternative field of operation a similar self-generated gas pressure may be used to react between the rotating and static members to provide the axial reaction force in a thrust bearing application.

BACKGROUND OF THE INVENTION

It will be appreciated that the self-generated gas pressure existing between sealing members can equally apply to assemblies which are both rotating but at different speeds as, for example, when sealing the annular spaces between the rotating assemblies of multi-shaft gas turbine engines. The environment surrounding such engines is too hot to allow the use of flexible polymer based sealing materials. In such situations one well-known method is to employ non-contacting sealing paths either in the form of labyrinths or closely positioned face-to-face members, either singly or in combination.

For a typical gas turbine annular seal of mean diameter=914 mm. (36 inches), the gap between the annular face sealing members would be in the range 0.038 mm. to 0.076 mm. (0.0015 to 0.0030 inches) in order to keep the gas leakage across the seal to within acceptable performance limits. In gas turbine engines where the high running temperatures cause relatively large movements and distortions of adjacent components, one common method of achieving the close face gap tolerance between the static and dynamic components of the seal is to provide axial movement controlled by spring members, or by pressurised gas acting on an annular area, to one of the components and to feed a supply of pressurised gas into the annular space between the static and dynamic members. The gas forms a thin aerostatic film between the static and rotating members of the seal assembly.

The leakage performance of such gas sealing assemblies can be enhanced in some cases by providing an additional gas labyrinth flow path or a single axially orientated restricted path (sometimes known as an air dam) and placing this restricted flow path in series with the radially orientated aerostatic flow path.

SUMMARY OF THE INVENTION

Embodiments of the present invention can improve the seal performance in terms of gas leakage rates and help to eliminate the additional weight and complexity resulting from the need to provide a separate gas supply to maintain the aerostatic gas film between the static and rotating members of the seal assembly. (In relatively rotating members, the slower member fulfills the role of the static member). This can be achieved by providing a series of wedged-shaped gas paths round the sealing annulus. The gas adjacent to the rotating member normally experiences a friction-generated drag effect and is drawn into the wedge-shaped spaces and so compressed before passing through the narrowest gaps between the stator and rotor members and thence being allowed to expand prior to entering the next wedged shape space in the seal circumference or escaping into the surrounding gas space. The normally static members forming the wedge shaped gas paths can be spring biased in the axial direction relative to the rotating member in such a manner that the integrated pressures, set up in the associated areas of the static members provide axially directed forces which balance the spring forces at the operating speeds of the rotating member. This can result in the static members "riding on a gas cushion" which, in practice, can be designed to provide very small stable gaps at the closest positions of the rotating and static members, typically gaps in the region of 0.025 mm. (0.001 inches) or less.

The wedged-shaped gas spaces can be formed by having the static member annular surface made in the form of flat faced "tiles" which may be roughly rectangular in shape or provided in abutting sets to form an annular shape. The tile surfaces may co-operate with a coned surface of the rotating member. The annular shape formed by the said tiles may be interrupted, having discrete tiles equally spaced round the circumference and co-operating with the rotating member when the tiles are being used to generate an axial force only and not being used to generate both a force and to act as a gas sealing member.

Each tile can be located at a pivot centre or fulcrum located on the tile side opposite to the side co-operating with the rotating member. The fulcrum may be provided with guide means so that the tile can move in an axis parallel to the rotating axis and be urged against the rotating member by an axial force which may be generated by spring means, for example. The fulcrum may be offset from the tile geometric centre and provides limited freedom of orientation of the tile by means of a spherical contact bearing at the fulcrum centre. This arrangement is such that, when the rotating member is static, with no gas pressure being generated at the cone surface, the tile is able to make line contact with the cone surface, the said line being in the same radial plane as the fulcrum.

The rotating conical surface and the surfaces of the co-operating tiles may be in contact for a short period of time during a start up sequence until the engine speed has built up sufficiently to generate the requisite gas pressure in the wedged-shaped spaces, such that the parting axial force just balances the spring or other forces urging the tiles against the conical surface. For this reason the co-operating surfaces may be hardened sufficiently to withstand the short period of running in contact.

When using the rotating cone and co-operating tiles in a gas sealing application there are alternative designs which may be used.

In one design the tiles themselves are used as both the normally static sealing members and also as the means of generating the small gas filled gaps between the static and rotating members. In this embodiment the tiles can be loosely abutting to form a complete sealing annular surface; the radial abutments are designed to allow a small degree of pitching movement round each tile fulcrum.

In an alternative embodiment, separate continuous rotating and static sealing faces may be provided—these can be either orientated normal to the rotation axis or "tilted" in line with the tile co-operating surfaces. In the latter case the rotating conical surface can be extended either at a larger or smaller radius than the radii occupied by the tiles. In this embodiment the tiles are not required to be abutting and can be spaced equally round the seal and are used only to generate the small running gap between the separate sealing surfaces.

According to a first aspect of the invention there is provided apparatus for spacing two relatively rotatable facing surfaces in use by entraining gas between the surfaces, the apparatus including:

a first portion defining a generally frusto-conical surface;

a second portion defining at least one flat surface disposed adjacent the first portion so that the two surfaces face each other and define at least one point of closest engagement between the surfaces, with diverging gaps extending between the surfaces on either side of a plane which contains the point or points of closest engagement and which extends generally orthogonal to the direction of relative rotation, and a device for biasing the flat surface towards the frusto-conical surface to maintain the gaps within a predetermined dimensional range.

The term "generally frusto-conical" encompasses not only a portion of a regular conical surface, whether or not a complete cone is present, but also "solids of revolution" which depart from the conical form, that is, in a section taken through the cone apex the shape may not be in the form of a straight sided triangle. For example, frusto-conical shapes whose surfaces are "distorted" to be concave or convex are also covered by the term.

The second portion may define a plurality of spaced substantially flat surfaces arranged circumjacent the frusto-conical surface to define respective points of closest engagement and associated gaps. Small distortions (e.g. of a few microns) may be present on the substantially flat surface. The surfaces may engage at the point of closest engagement when the portions are not rotating relative to each other. The first portion can be rotatably mounted and the second portion can be non-rotating.

In some embodiments, the second portion includes a carrier and at least one tile element mounted on the carrier to define the flat surface. The or each tile element may be pivotably mounted on the carrier.

A plurality of said biasing devices may be provided, each said biasing device being associated with a respective said flat surface. There may be a series of points of closest engagement defining a line and the or each pivot lies in the plane which contains the line. The biasing device can act on the plurality of spaced flat surfaces. The carrier may be annular and there are a plurality of tile elements arranged around the carrier.

The or each tile element may be generally rectangular. Two opposing sides of the tile or each element may be curved. One of the curved sides of the tile can have a radius-substantially equal to or greater than the outer radius of the conical surface and the other curved side of the tile can have a radius substantially equal to or less than the inner radius of the conical surface. The radial depth of the tile may be 10-15% greater than that of the conical surface.

The surfaces may be relatively positioned in the direction of relative rotation such that the torques generated on the flat surface by the entrained gas are balanced about the point or points of closest engagement. The apparatus may include a mechanism for rotating the first portion.

The first portion and/or the second portion may be formed of or coated by a ceramic material. The frusto-conical surface may be part of a right circular cone. The generally frusto-conical surface can be concave or convex. The biasing device can include a wave spring, a thrust bearing and/or a set of coil springs, which may be substantially equally spaced around the carrier.

The apparatus may further including a third portion defining at least one flat surface disposed adjacent a further frusto-conical surface on the first portion and substantially opposite the second portion such that the forces generated by the second and third portions are substantially equal and opposite.

The apparatus may have a thrust connection for transmitting thrust, but not rotation. The thrust connection can include a projection cooperating with a recess or cavity. The cavity and the projection may include corresponding partially spherical surfaces.

When the apparatus is used as a gas seal, the separation of the surfaces is sufficiently narrow to form a seal. A path may be provided between the outside edge of the first and second portions to limit the flow of air or gas around the back of the second portion. The first portion can be connected to or provides a first sealing surface, and the second portion can be connected to or provides a second sealing surface which forms a seal with the first sealing surface.

In one embodiment, the second sealing surface is located within a housing having a ring, the second sealing surface being slidable on the ring so that it can be brought in and out of contact with the first sealing surface. The housing may include a recess behind the second sealing surface. The biasing device may be or include an axial wave spring housed in the recess. The ring can include an upstand portion for retaining the components of the seal together in a pre-assembled condition. The upstand portion can form an air dam. The biasing device can deflect the tile element into contact with the first portion when the first portion ceases to rotate.

The apparatus may further include an axially moveable tile carrier defining a radial sealing surface for forming, with a further radial sealing surface, a radial seal to separate internal and external pressure areas and an axially sealing surface cooperating with an axially slidable seal to separate the internal and external pressure areas whereby the radial location of the seal is selected such that the pressure applied by the internal and external pressure areas to the radial sealing surface is substantially balanced by at least the internal and external pressures applied to respective pressure-balancing surfaces opposing the radial sealing surface.

The gas seal can include a piston ring located between the surface and the seal. The tile carrier may be provided with a cylindrical sliding surface containing a groove into which is fitted a piston sealing ring, the sliding surface and the piston sealing ring cooperating with a cylindrical bore formed in a seal static back member such that the cylindrical bore together with the cylindrical surface and the tile carrier define a closed annular space. The gas seal can further include a valve for venting the enclosed gas space. Venting of the enclosed gas space may cause the tile carrier to withdraw from engagement with the further radial sealing surface. The gas seal may further including a containing ring defining a space for containing any debris resulting from a tile failure.

The radial sealing surface may be at least partially formed of or coated with an abradable material so that in the event of a tile failure the unbalanced forces drive the tile carrier into contact with the pressure-balancing surface, the material being abraded away, thereby preventing contact between the pressure-balancing surface and the radial sealing surface.

The rotating face seal may be at least partially formed of or coated with an abradable material so that in the event of a tile failure the unbalanced forces drive cutting blades on the tile carrier into contact with the material so that it is abraded away, thereby preventing contact between the pressure-balancing surface and the radial sealing surface. Alternatively, the tile carrier may be at least partially formed of or coated with an abradable material so that in the event of a tile failure the unbalanced forces drive cutting blades on the rotating face seal into the abradable material, the material being abraded away, thereby preventing contact between the pressure-balancing surface and the radial sealing surface. The tile carrier may include a device for limiting axial travel of the tile carrier.

According to another aspect of the invention there is provided an axially moveable tile carrier defining a radial sealing surface for forming, with a further radial sealing surface, a radial seal to separate internal and external pressure areas and an axially sealing surface cooperating with an axially slidable seal to separate the internal and external pressure areas whereby the radial location of the seal is selected such that the pressure applied by the internal and external pressure areas to the radial sealing surface is substantially balanced by at least the internal and external pressures applied to respective pressure-balancing surfaces opposing the radial sealing surface.

According to a further aspect of the invention there is provided apparatus including two relatively rotating grooveless surfaces arranged such that, over a normal design rotation range, the two surfaces are held apart at a gap due to self-generated air or gas pressure existing between the surfaces which, by acting on discrete areas, produces a force aligned in an axial direction relative to the axis of the rotation, the force being balanced by a biasing device to maintain the gap.

One of the surfaces may be generally frusto-conical and the other surface may be flat.

According to yet another aspect of the invention there is provided apparatus for spacing two relatively rotatable facing surfaces in use by entraining gas between the surfaces, the apparatus including:
   a first portion defining a generally frusto-conical surface;
   a second portion defining at least one flat surface disposed adjacent the first portion so that the two surfaces face each other and define at least one line of closest engagement between the surfaces, with diverging gaps extending between the surfaces on either side of the line or lines of closest engagement, and
   a device for biasing the flat surface towards the frusto-conical surface to maintain the gaps within a predetermined dimensional range.

According to a further aspect of the invention there is provided a method of forming part of a labyrinth seal during a seal assembly pre-run, the method including steps of allowing circular cutting blades on a tile carrier portion of the seal assembly to drive into another portion of the seal assembly formed of or coated by abradable material, the axial distance moved by the tile carrier terminating beyond the normal running position of the seal assembly.

According to another aspect of the invention there is provided a method of forming part of a labyrinth seal during a seal assembly pre-run, the method including steps of allowing circular cutting blades to drive into a tile carrier portion of the seal assembly formed of or coated by abradable material, the axial distance moved by the tile carrier terminating beyond the normal running position of the seal assembly.

BRIEF DESCRIPTION OF THE DRAWINGS

The improvements which are the subject of this invention will now be described by way of example with reference to specific embodiments which are shown in the accompanying drawings in which:—

FIG. 1 shows a simplified view looking in an axial direction, relative to the rotating member turning centre, of a single tile resting in contact with the conical surface of the rotating member.

FIG. 2 is a sectional view of the same tile and rotating member, the section being taken in a radial plane passing through the tile fulcrum;

FIG. 3 is a localised sectional view taken in a radial plane containing one edge of the tile and showing the maximum gap created between the tile edge and the conical surface when the tile is in line contact with the said surface, the line being in the same radial plane as the tile fulcrum;

DETAILED DESCRIPTION OF THE PREFERRED EMBODIMENTS

Figure 4:
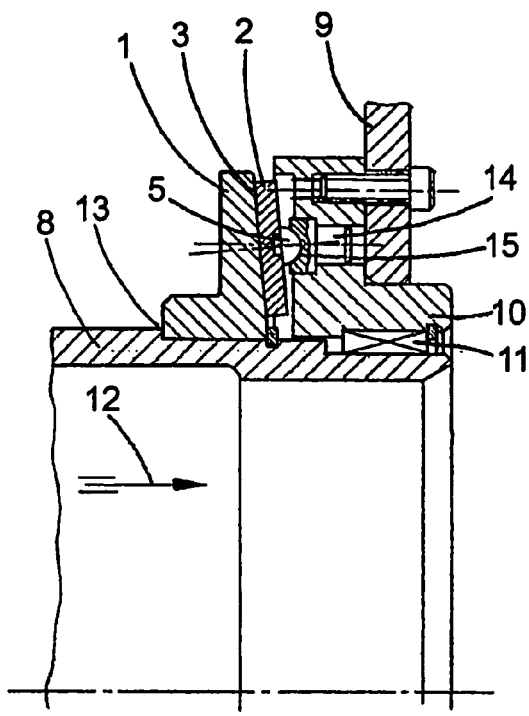
FIGS. 4 and 5 show a radial section and a localised axial view of a tile (one of a set) and the rotating conical member installed in an engine and acting as a thrust bearing.

Referring to FIGS. 1 and 2, the rotating member 1 and tile 2 are shown in simplified form, the tile being urged against the conical surface 3 of the rotating member by the spring member 4. The side of the tile remote from the conical surface is provided with a spherical seated pivot centre or fulcrum 5 such that, with the rotating member 1 stationary, the spring member 4 will cause the tile 2 to make line contact with the conical surface 3, the line being in the same radial plane indicated by axis 6 in FIG. 1.

The cone angle Ø in FIG. 2 is defined as the angle that a line on the cone surface passing through the cone apex makes with an axis, which is at right angles to the rotation axis. The angle Ø is very small, typically within the range 0.3 to 1.0 degrees; but has been illustrated larger in FIG. 2 and subsequent figures for reasons of clarity.

With the rotation of member 1 as indicated by the arrow 7 in FIG. 1 the radial edge AB of the tile is designated the "leading edge": the other radial edge is designated the "trailing edge". The angular displacement of the leading edge from the axis 6 passing through the fulcrum 5 is shown as θ. With the engine stationary and the tile 2 in contact with the conical surface 3 a wedged shaped gap is produced having a maximum value at corner A. In a typical design this gap, when the tile is in contact with the cone on line 6 will not exceed typically 0.100 mm. (0.004 inches).

FIG. 3 shows a localised sectional view taken on the plane XX in FIG. 1. The width of the gap at any position beneath the tile is dependent on the values of the cone angle and the offset angle from the axis 6 and radius OP designated "R" in FIG. 1. Taking a random point at Q, the gap between the tile and the conical surface at Point Q is denoted by the distance S in FIG. 3 and may be calculated using the trigonometric relationship:—

$$S = R \times (\text{Tan } \emptyset \times \text{Cos } \emptyset) \times ((1/\text{Cos } \theta) - 1)$$

Taking a practical example for a relatively small diameter seal assembly with the value R=100 mm. (3.94 inches) and angles θ=15 degrees and cone angle Ø=0.5 degrees this will give a leading edge gap at Q in FIG. 3 equal to 0.0308 mm. (0.0012 inches). The above equation is intended to give an approximation of the distance S, but it will be appreciated that when the apparatus is in use variations can be expected.

With an engine fitted with the rotating and stationary members as described and illustrated in FIGS. 1, 2 and 3 and with the engine at rest the tile 2 will be in contact with the conical surface 3. As the rotating member 1 speeds up a condition is reached where the air or gas friction drag, set up in the wedged-shaped space between the tile 1 and the conical surface 3, generates sufficient air or gas pressure above the surrounding environmental pressure and acting on the tile surface area to overcome the force exerted by the spring member 4 and the tile "lifts" off the rotating surface.

The amount of "lift" generated by the increased air or gas pressure in the wedged-shaped space is a function of the speed of rotation of the conical surface 3, the area of the co-operating tile 2 and the force generated by the spring member 4. These parameters can be arranged such that the lift generated over the normal engine speed range can be confined to relatively small amounts typically giving a running gap at the narrowest region of the wedged shaped space of not more than 0.015 mm. (0.0006 inches).

It should be understood that, once the running gap is formed, a circumferential flow of air or gas passing through the gap will set up. This flow will be sufficient to create some pressure in the "trailing" cavity beneath the tile. The combination of the leading and trailing pressure distribution provides the total axial force on the tile which is balanced by the force exerted by the spring member. This pressure distribution also determines the position of the fulcrum 5 relative to the tile perimeter, the position being chosen to eliminate as far as possible any turning moments round the fulcrum.

The radial depth of the tile may be 10-15% greater than that of the conical surface. Experiments have shown that having the radial depth of the tile 10-15% greater can be advantageous.

Figure 5:
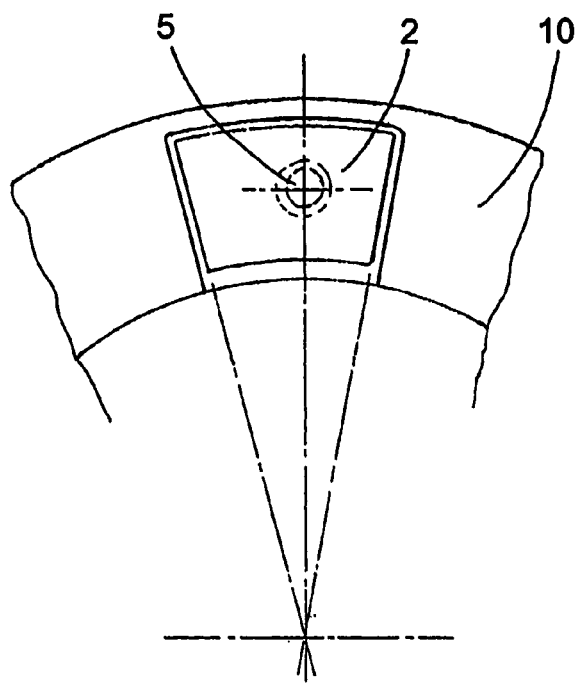

FIGS. 4 and 5 show the rotating member and tile installed in an engine and operating as a shaft thrust bearing. In this embodiment an engine shaft 8 is located in the engine frame 9 by means of a bearing housing 10 and journal bearing 11. The journal bearing is of the type that provides no axial constraint to the shaft 8. The axial thrust on the shaft is in the direction of the arrow 12 and this thrust is transmitted through the shoulder 13 to the rotating member 1 having the conical surface 3. In practice a set of tiles will be positioned, equally spaced, around the shaft each tile taking a proportion of the total end thrust. FIG. 5 shows an axial view of one such tile looking towards the engine frame and bearing housing with the shaft 8 and rotating member 1 removed to reveal the co-operating face of the tile 2.

FIG. 4 shows a tile 2 in contact with the conical face of the rotating member 1 the shaft 8 being stationary. When the shaft is rotating at speeds within its normal operating range a small gap will be formed between the tiles 2 and the rotating conical face 3; the engine assembly being so arranged that a small axial movement is provided to accommodate the aerodynamic thrust bearing working gaps.

The axial thrust is transmitted to the bearing housing 10 and engine frame 9 by means of the thrust peg 14 projecting from the tile fulcrum. This peg is provided with a part spherical cavity 15 which co-operates with the tile fulcrum 5.

In situations where no axial movement of the shaft is permitted the aerodynamic thrust bearing can still be used by replacing the journal bearing 11 with a bearing arrangement that will take the shaft end thrust for a limited number of revolutions only during the start up cycle of the engine.

The pegs 14 are now provided with the small axial movement relative to the bearing housing 10 needed to create the aerodynamic working gap and each peg may be provided with spring means to hold the tiles in contact with the conical surface when the engine is at rest. Under this arrangement the end thrust will be progressively transferred from the shaft bearing to the aerodynamic thrust bearing during the start up cycle.

Figure 6:
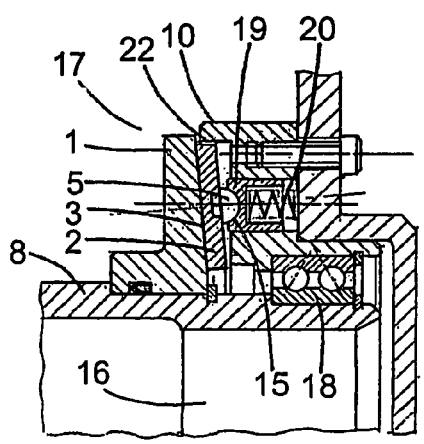
FIGS. 6 and 7 show similar views of the installation of abutting tiles in an engine where the tiles are acting both as sealing members and the means of generating the small gas filled gaps between the rotating and static members of the seal.
Figure 7:
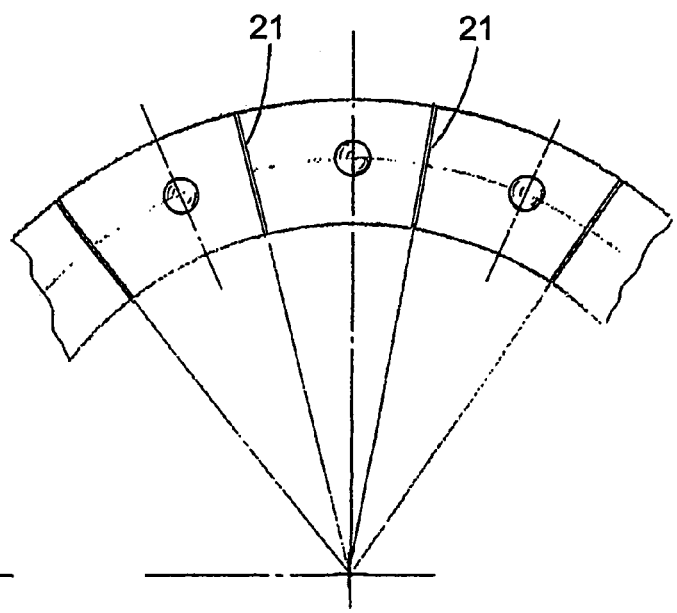

FIGS. 6 and 7 show a further embodiment in which the tiles and the rotating member are used to provide a partial gas seal between two regions of an engine. In the example illustrated in FIG. 6 the requirement is to isolate, substantially, the gas spaces 16 within the hollow shaft 8 and the shaft bearing 18 from the surrounding space 17. With the shaft stationary each tile is held against the conical surface 3 of the rotating member 1 by the thimble 19 and spring 20, the thimble being provided with a part spherical cavity 15 co-operating with the fulcrum 5. As the shaft rotates up to its normal speed range each tile moves out of contact with the conical surface due to the action of the air or gas pressure build up formed in the wedged shaped cavities between each tile and the rotating conical surface. This axial movement will be, typically, within the range 0.038 to 0.076 mm. (0.0015 inches to 0.0030 inches) as previously stated, the movement being transmitted to the spring-loaded thimbles 19.

FIG. 7 shows the tiles formed into an annular sealing ring each tile being in loose abutting contact on radial axes 21 with the adjacent tiles. The term "loose" is used because the tiles need to have some small limited freedom of pitching movement round the part spherical fulcrum bearings. It is also necessary to provide a circular restricted path 22 in FIG. 6 between the outside edge of the tiles and the bearing housing 10 in order to limit the flow of air or gas round the back of each tile.

Figure 8:
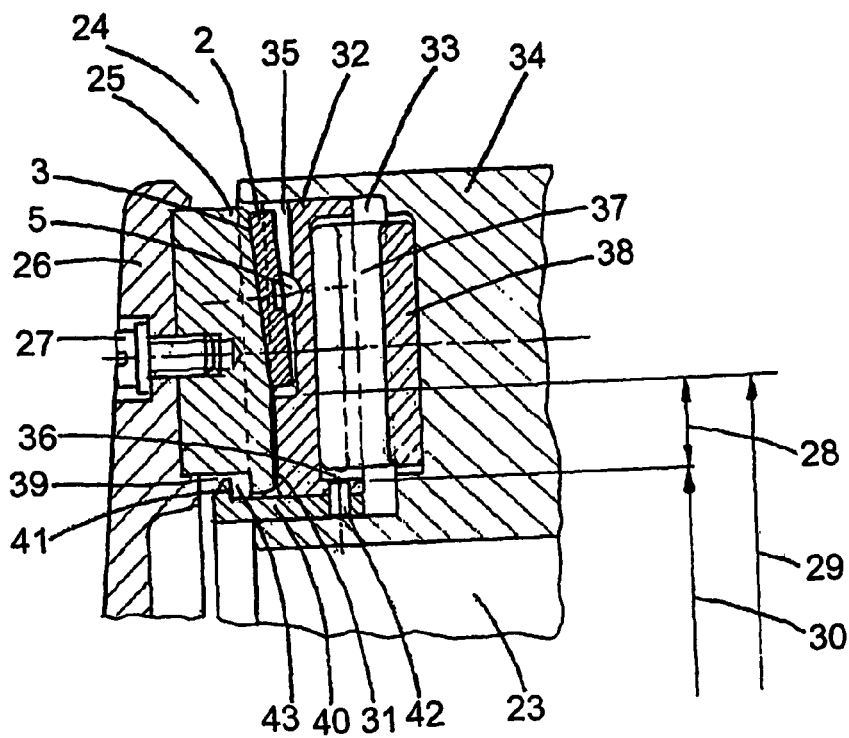
FIGS. 8 and 9 show a localised radial section and an axial view (with the rotating member removed) of one of the tiles of a set installed in an engine and acting as the means of generating the small gas filled running gap between the associated co-operating sealing surfaces.
Figure 9:
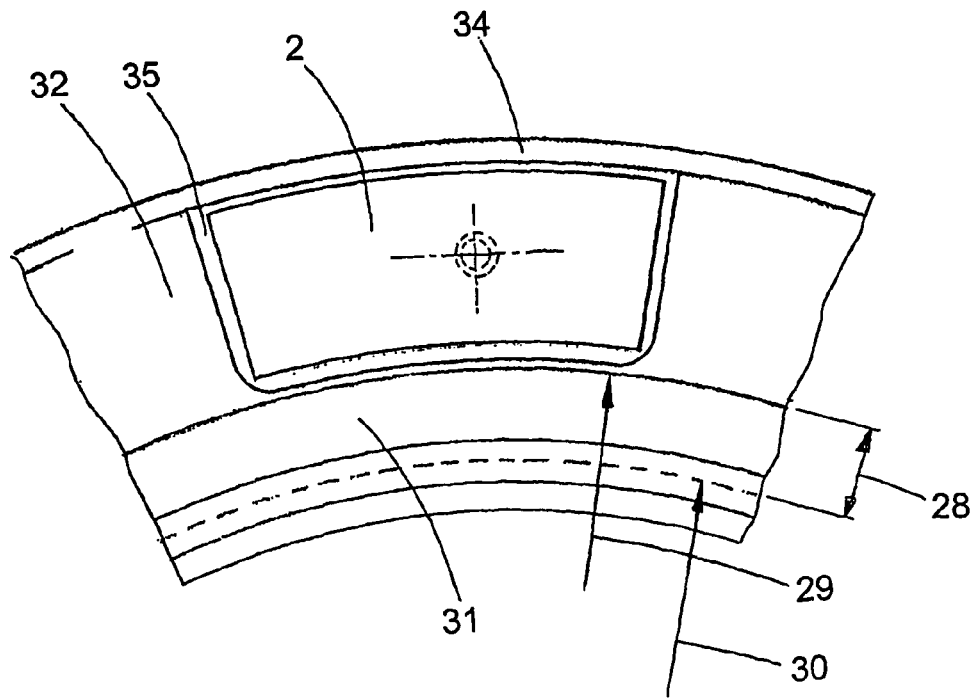

FIGS. 8 and 9 show an embodiment used in an engine air or gas sealing application in which the tiles, co-operating with the rotating conical surface, generate the small running gap between separately located annular sealing surfaces. The gap so generated is substantially equal to the gaps set up between the tiles and the rotating conical surface by the aerodynamic pressure in the wedged shaped spaces. In this embodiment the parting axial force is balanced by a single spring member in the form of an "axial wave spring". Also shown in this embodiment is an additional restricted air or gas flow path in the form of an "air dam". The parts forming this path restriction also act as holding and locating components arranged to assist the assembly of the seal components into the engine.

Referring to FIG. 8, showing a localised sectional view of the seal assembly on a radial plane passing through a tile fulcrum, the gas regions to be partially isolated by the seal are the spaces 23 and 24. The conical surface 3 is now formed on a separate annular component 25 which is secured to the engine-rotating member 26 by the screws 27. The annular component 25 is extended beyond the conical surface 3 to form a gas sealing area 28 occupying the circumferential space between radii 29 and 30. This surface is illustrated as in a plane at right angles to the rotation axis but it could be at any small angle to the rotation axis and, in particular for convenience in manufacture, the surface could be a continuation of the conical surface.

The co-operating static sealing surface 31 is formed on an annular shaped component 32 which is free to slide axially in a recess 33 formed in the engine housing 34. The component 32 is provided with locally recessed surfaces 35 to accommodate the tiles 2 and the part spherical depressions for the tile fulcrum.

The number of recesses and tiles in the annular component 32 may be equally spaced round the rotation axis. One such tile and recess is shown in FIG. 9 which is an axial view with the rotating components 25 and 26 removed to reveal the working surface of the tile 2 and the static annular component 32. The rear side of this component is provided with an annular recess 36 into which is located the axial wave spring 37. This spring member is manufactured from rectangular section spring metal strip and made into an interrupted circular form and may also be located in a groove 38 situated at the bottom of the recess 33. A full description of a wave spring is given in British Patent Application No. 0217539.6, which is incorporated herein by reference.

An air dam restriction path 39 is formed as illustrated in FIG. 8 by a cylindrical shaped ring 40 carrying a circular upstand portion 41 which makes the restricted "dam" path with the rotating member 25. The ring 40 may be riveted or otherwise attached to the annular shaped component 32 and may form the sliding cylindrical gas sealing path in the recess 3.

In the particular embodiment shown in FIG. 8, before the ring 40 is attached to the annular shaped component 32 by means of the rivets 42, the rotating member 25 needs to be assembled on to the ring 40 so that the rotating member is now "trapped" between the upstand portion 41 and the annular shaped component 32. The annular, cylindrical orientated gap 43 determines the axial movement of the rotating member 25 relative to the component 32. This gap may be sufficiently large to permit the assembly of the tiles into their recesses, allowing the fulcrum to drop into its part spherical recess after the rivets 42 have been fitted.

Alternatively, the gap 43 may be narrowed such that the tiles have to be preassembled with the rotating member 25 so that, once the rivets are inserted, the tiles are held permanently in the seal assembly because the axial movement is insufficient to extract the tile fulcrum from the part spherical recess. The advantage of this arrangement is that all the components of the seal, except the axial wave spring, can be preassembled away from the engine and then offered up to the engine rotating member 26 without the problem of having to provide additional means of temporarily holding the tile in place as the seal assembly is entered into the recess 33.

It will be appreciated that the air dam 39 formed by the upstand 41 may be replaced with a cylindrical labyrinth provided that the axial "float" between the static and rotating co-operating members of the labyrinth is sufficient to accommodate the aerodynamic gap generated between the tiles and the conical surface plus any additional manufacturing tolerance build up and the small changes in thickness of the components of the seal due to the need to redress the working surfaces during an engine service.

Thus it can be seen that the use of a rotating conical surface associated with a ring of flat tiles provides a significantly improved method of designing both axial thrust bearings and high temperature air and gas shaft seals over the known methods involving the use of separately compressed air or gas being fed into the radial space between the rotating and static members of the seal assembly.

When the arrangement is used as a self aspirating gas seal to isolate, for example, the rotating mechanical assemblies from the combustion gases in a gas turbine engine an abutting ring of tiles, co-operating with the rotating conical surface may be employed in which case the tiles are acting both as one of the face sealing surfaces and are also involved in establishing the small axial travel needed to prevent physical contact with the rotating conical surface.

In an alternative sealing embodiment, the tiles may be spaced separately round the rotating conical surface and used only to generate the small gap required to keep an adjacent pair of radial sealing static and rotating surfaces from coming into physical contact.

The rotating and static surfaces provided by the embodiments described above are so arranged that, over the normal speed range of the rotating member, the two said surfaces are held apart at a small gap due to the self generated air or gas pressure existing between the surfaces which, by acting on discrete areas, produces a force aligned in an axial direction relative to the rotation axis, the said force being balanced by spring or other means in order to maintain the said small gap.

In engine applications, where the seal is being used to separate the gas streams surrounding the rotating members and particularly in gas turbine applications, both the absolute pressure values and the pressure difference values existing across the seal faces are substantial. These pressures, acting on both the circular area being isolated by the seal and the annular area occupied by the seal radial faces, can set up large axially directed forces which, unless balanced, will add or subtract to the axial forces being generated by the tiles and the conical faced rotor. On method of balancing out these pressure induced forces is shown diagrammatically in FIGS. 10 and 11.

Figure 10:
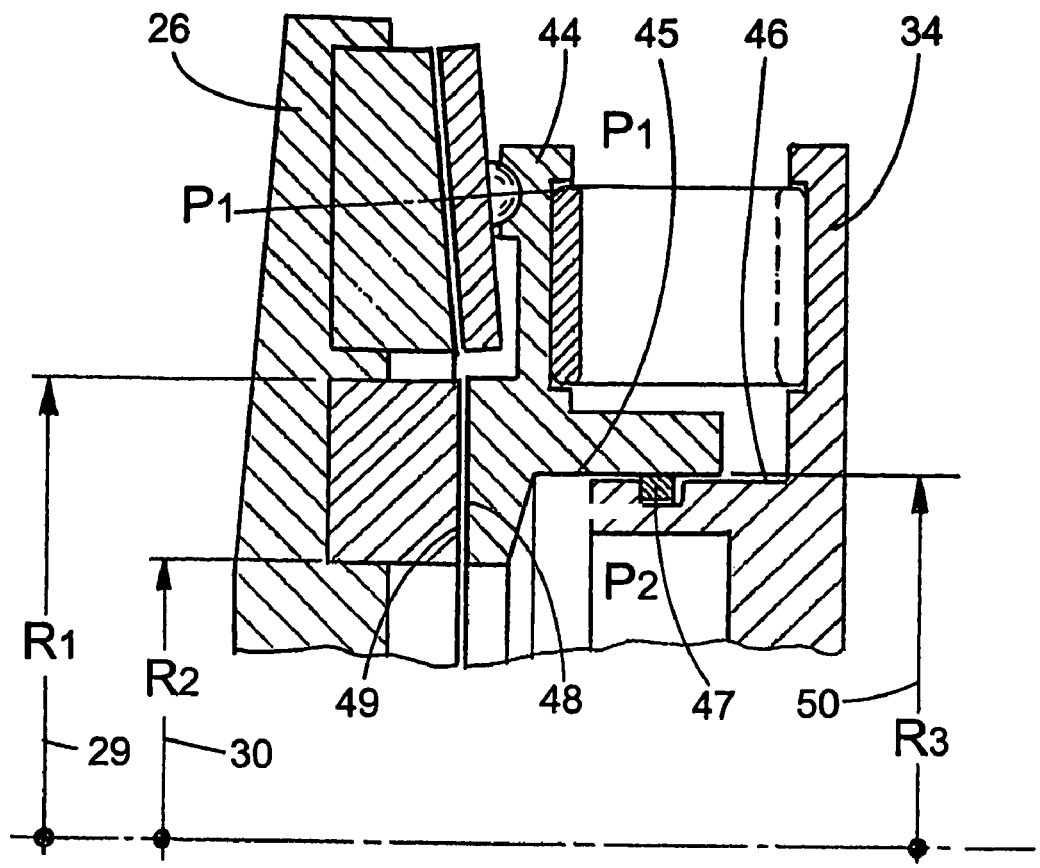
FIGS. 10 and 11 are diagrammatic representations of the frusto-cone rotor and tiles with a separate radial face seal and the associated pressure balancing features.

Referring to FIG. 10, the static annular component 32 in FIG. 8 has now been replaced by a tile carrier 44 which is provided with a cylindrical sliding surface 45 and is free to slide axially on a circular protruding surface 46 forming part of the engine housing 34. The tile carrier 44 is also provided with a radial sealing surface 48 cooperating with a corresponding sealing surface 49 forming part of the engine rotating member 26. A piston sealing ring 47 may be provided in a groove in the surface 46 in order to isolate, substantially, the gas spaces existing outside the seal at pressure $P_1$ from the gas at pressure $P_2$ occupying the spaces within the piston sealing ring radius 50. This radius will normally have a value lying between the radii 29 and 30 defining the outer and inner radii of the radial sealing surfaces 48, 49.

Figure 11:
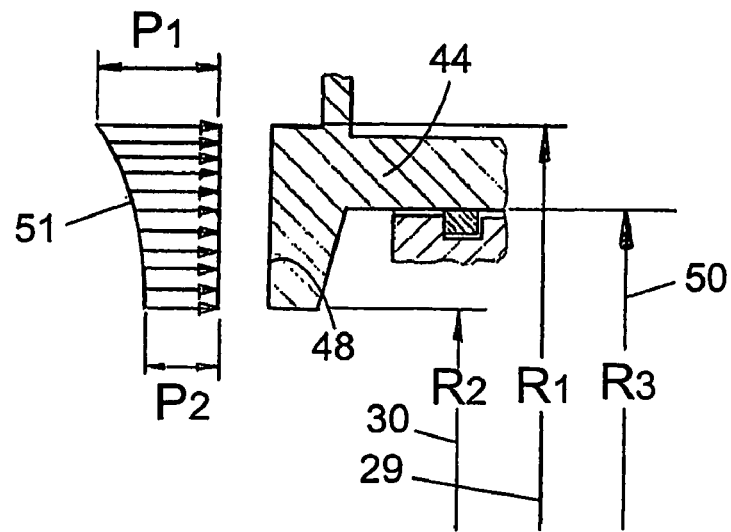

FIG. 11 is a diagram illustrating the nature of the pressure distribution across the radial sealing faces. The outer 28 and inner 30 radii of the faces are shown having values $R_1$ and $R_2$ respectively and the piston sealing ring radius 50 is shown having the value $R_3$. In the example as illustrated it is assumed that the outer pressure $P_1$ is higher than the inner pressure $P_2$ resulting in a falling pressure gradient 51 across the seal face. The form of the curve can be determined by experiment or from theoretical gas flow relationships.

Once the shape of the curve 51 is determined, an integration sum can be set up to find the total force exerted on the tile carrier 44 by the film of pressurised gas flowing between the radial sealing surfaces and acting on the surface 48. The mathematical form of the relevant equations is expressed by a Double Integral expression:—

$$\text{FORCE} = 2\pi \int_{P_2}^{P_1} \int_{R_2}^{R_1} (P \times R) dP \cdot dR$$

This force is trying to open out the radial sealing surfaces and is opposed by the outer and inner pressure $P_1$ and $P_2$ acting on the respective areas formed, in the case of pressure $P_1$ by the annulus $(R_1-R_3)$ and in the case of pressure $P_2$ by the annulus $(R_3-R_2)$.

The size of the radius $R_3$ can now be determined to balance out the pressure generated forces at the normal running conditions of the engine using the derived equation.

$$2\int_{P_2}^{P_1}\int_{R_2}^{R_1}(P\times R)dP\cdot dR=P_1(R_1^2-R_3^2)+P_2(R_3^2-R_2^2)$$

(Notes:—The π term cancel out)

It is found in practice that, once a balancing value of $R_3$ is determined, subsequent variations in pressures $P_1$ and $P_2$ do not cause any significant out of balance forces.

Figure 12:
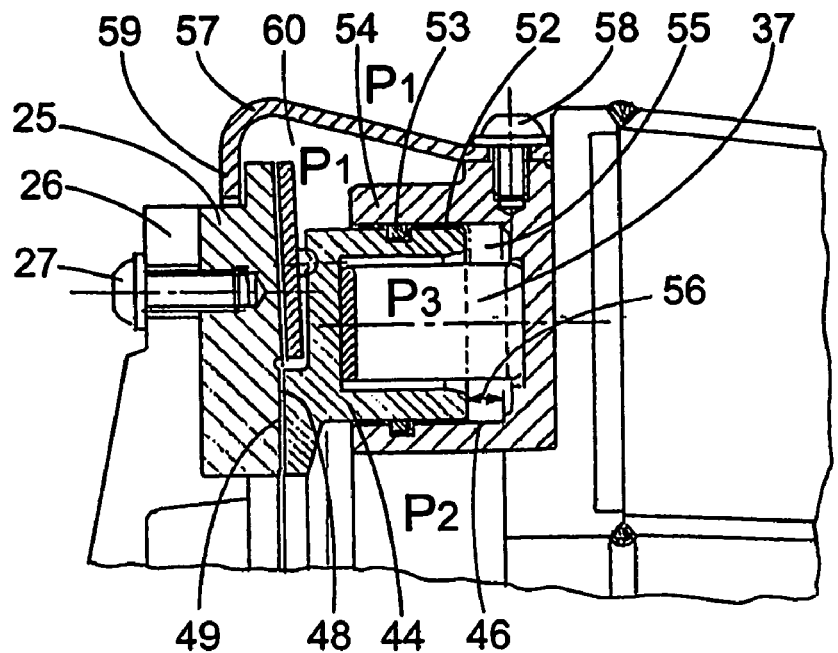
FIG. 12 shows a localised radial section of a gas turbine seal provided with pressure balancing and seal withdrawal features.

FIG. 12 shows one design of a gas turbine seal employing the balancing feature covered in the diagram FIGS. 10 and 11 but with an added feature designed to protect the engine in the event of a failure of the operation of the aerodynamic film being self generated between the tiles and the conical surface of the engine rotating member 26. In this embodiment the tile carrier 44 is provided with an additional cylindrical sliding surface 52 containing a groove into which may be fitted a piston sealing ring 53.

The surface and piston sealing ring cooperate with a cylindrical bore formed in the seal static back member 54 such that this bore together with the cylindrical surface 46 and the tile carrier 44 now form a closed annular space 55 containing the wave spring 37. The gas pressure in this annular enclosed space is designated $P_3$.

For normal running conditions the annular space 55 is vented, via a two position three port valve, to the pressure $P_1$ so that $P_3=P_1$ and the pressures are now in balance as shown and described in FIG. 10 and the associated text.

In the event of a tile failure, the tile carrier 44 will be urged towards the rotating member under the action of the axial force generated by the wave spring 37 causing the radial sealing surface and undamaged tiles to make contact with the engine rotating member 26. This failure condition may be sensed, for example, by a sudden rise in temperature of the radial sealing surfaces 48 and 49 causing a signal to be sent to switch over the two position valve. This action will close the vent path from pressure $P_3$ to $P_1$ and open an alternative vent path from pressure $P_3$ to the lower pressure $P_2$ or to atmospheric pressure. In either case the fall in pressure $P_3$ will be sufficient, acting on the annular area, to overcome the wave spring force and cause the tile carrier 44 to be withdrawn from the engine rotating surface.

The amount of axial withdrawal movement made by the tile carrier 44 is determined by the distance 56 as shown in FIG. 12. This would normally be made to provide the maximum safe withdrawal distance from the rotating member so that the engine may continue to run, albeit with a higher gas leakage rate than normal between the outer and inner gas spaces at the pressures $P_1$ and $P_2$.

Also illustrated in FIG. 12 is a seal assembly containing ring 57 which is attached to the seal static back member 54 by the screws 58. The containing ring 57 has a turned inwards portion 59 and is normally split at a single butt joint so that it is able to be passed over the outer radius of the modified annular component 25 and so hold all the seal assembly components together prior to mounting in the engine and attaching the annular component 25 to the engine rotating member by the screws 27. For clarity in FIG. 12 only the seal assembly components have been cross hatched in order to differentiate them from the adjacent engine components.

A further use for the seal assembly containing ring 57 is to enclose the annular space 60 which will contain any debris resulting from a tile or tiles failure and thus prevent such debris from reaching and possibly damaging other working parts of the engine.

Figure 13:
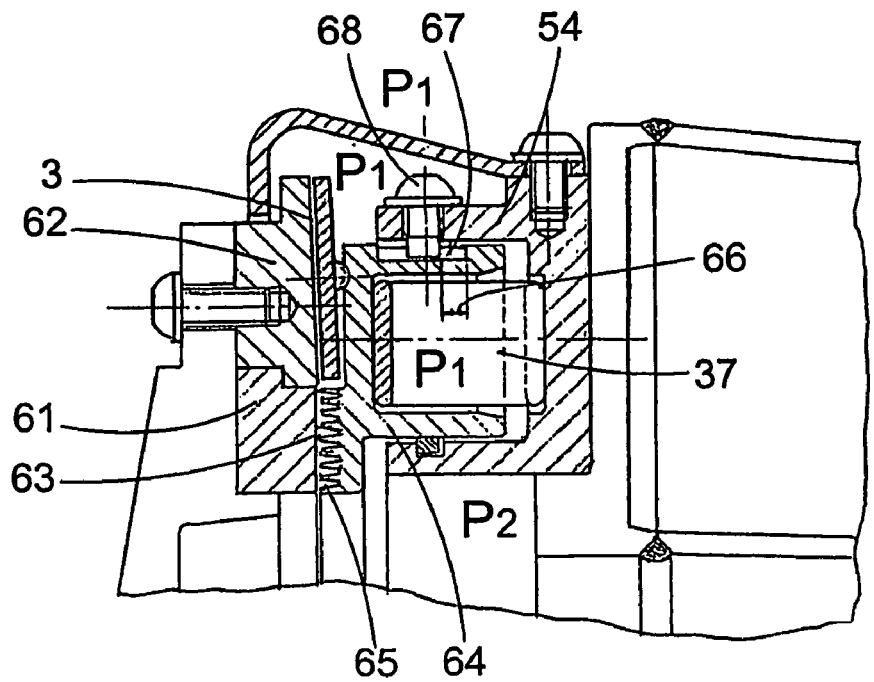
FIG. 13 shows a localised radial section of a gas turbine seal provided with pressure balancing and abradable face seal features.

FIG. 13 shows an alternative embodiment to that described in FIG. 12 and may be used when it is required to combine the radial face seals with a radial labyrinth seal. The design also makes use of abradable sacrificial material for the rotating face seal 61 so avoiding the requirement to have a closed gas space behind the tile carrier and the pressure switching arrangements covered in FIG. 12.

The rotating annular component 62 is provided with the conical surface 3 as in previously described embodiments but the rotating half of the radial face 63 is made separately from an abradable material. The tile carrier ring 64 is provided with a set of concentric circular grooves 65 spanning the whole radial depth of the face seal.

The grooves may be tapered so that the material between adjacent grooves terminates at the seal face in a narrow circular blade to assist the cutting action when the tile carrier ring makes initial contact with the rotating radial face 63. In this embodiment, therefore, in the event of a title failure, the tile carrier ring 64 extends from the static back member 54 being pushed out by the unopposed force generating by the wave spring 37 resulting in the circular cutting edges of the face labyrinth cutting into the abradable surface of the radial face 63.

In an alternative embodiment, the abradable material is formed on part of the surface of the tile carrier 64, so that in the event of a tile failure the unbalanced forces drive cutting blades on the rotating face seal 61 into the abradable material.

The axial distance 66 traveled by the tile carrier ring 64 is controlled by the grooves 67 and the stop screws 68 as shown in FIG. 13. It will be appreciated that, in order to improve the normal running performance of the radial seal, the axial lengths of the labyrinth circular cutting edges may be extended and a pre-run of the assembled seal may be done at a lower than normal speed in order to allow the labyrinth circular edges to cut into the abradable material of the radial face seal 63 until a position just past the normal running balanced position is reached. In an alternative embodiment, the tile carrier portion 64 can be formed of or coated by abradable material and grooves 65 on an adjacent part of the seal may be driven into the material. These arrangements will ensure that the radial gas path through the seal will be in the form of a true labyrinth with no straight paths existing between the high and low pressure gas spaces.

Figure 14:
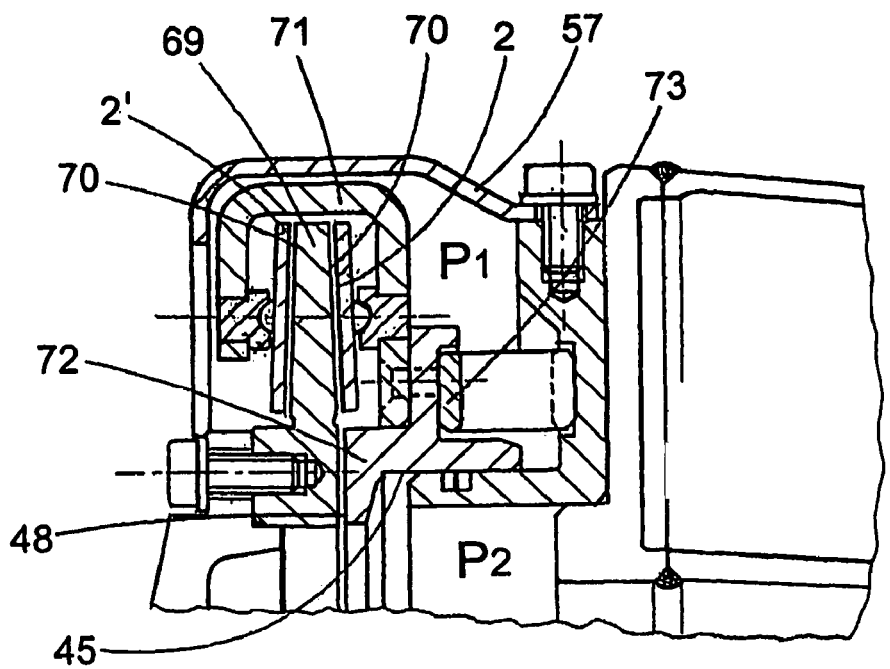
FIG. 14 shows a localised radial section of an embodiment including two conical sections.
Figure 15:
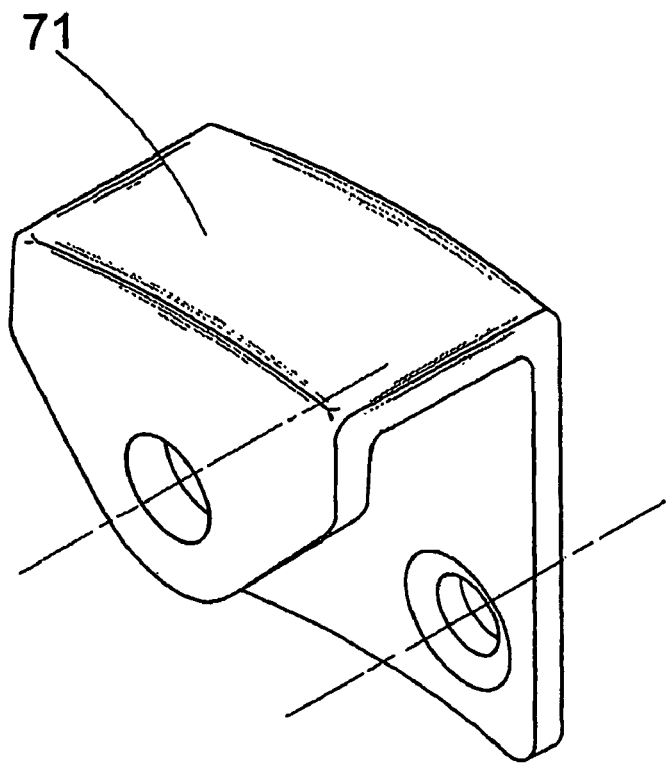
FIG. 15 illustrates a holder used in the embodiment of FIG. 14.

A further embodiment covering the use of the coned rotor and flat tile in order to generate a controlled axial force is illustrated in FIGS. 14 and 15. These two figures illustrate the tiles used to control the small axial gap in an adjacent radial face gas seal; but the arrangement could equally well be used in a thrust bearing application, particularly in situations where the bearing has to deal with axial thrusts which can be generated in either axial direction.

In the embodiment shown in FIG. 14, the rotor 69 is provided with two coned surfaces 70 arranged back to back so that the forces generated by the pair of tiles 2, 2' oppose each other. Each pair of tiles cooperating with the rotor 69 is mounted in a saddle shaped holder 71, shown separately in FIG. 15, fixed by screws to the tile carrier ring member 72. This member may also provide the non-rotating surface 48 of the radial gas seal as well as cylindrical sliding surface 45 forming one half of the seal pressure balancing arrangement.

In operation, the tiles in opposition to each other normally take up a central position on either side of the rotor. In this state any axial force acting in a direction to displace the rotor from its central position relative to the holder 71 will generate an opposing force in the tile being urged towards the coned surface and, simultaneously, reduce the assisting force being generated by the opposite tile which is being urged away from the opposite coned surface. The combined system, therefore, produces an effect similar to having two pre-compressed, very high rate opposing coil springs holding the rotor in a central position.

A light spring, typically in the form of a wave spring 73, may be added to the assembly in order to bias the carrier ring 72 and the associated holders 71 in one direction, producing a small axial deflection from the mean position relative to the rotor 69. This additional spring may be of advantage in ensuring that the associated face sealing surface 48 may be held to a minimum working practical distance from the cooperating face on the rotor 69.

As in previous diagrams, only those components forming the complete seal assembly have been cross hatched in FIG. 14. The various components may be held loosely together, prior to assembly in the engine, by means of the modified containing ring 57 in a similar manner to the arrangement shown in FIG. 12.

It will be appreciated that in the event that the pressures $P_1$ and $P_2$ may vary in such a manner that the resulting axial force generated by these pressures may act in either direction, an additional sealing surface may be added to the as-illustrated non-sealing side of the rotor in FIG. 14.

As has been mentioned in the introduction, although the description for convenience refers to static and rotating members the tiles and the frusto-conical surface may be relatively rotating.

The invention claimed is:

1. Apparatus for spacing two relatively rotatable facing surfaces in use by entraining gas between the surfaces, the apparatus including:
   a first portion defining a generally frusto-conical surface;
   a second portion defining at least one flat surface disposed immediately adjacent the first portion so that the two surfaces face each other and define a point or a line of closest engagement between the surfaces, with a diverging gap extending between the surfaces on one side of a plane which contains the point or line of closest engagement and with a converging gap extending between the surfaces on another side of said plane, the gaps extending in a substantially circumferential direction relative to the two rotatable facing surfaces;
   a device for biasing the flat surface towards the frusto-conical surface about a pivot center to maintain the gaps within a predetermined dimensional range;
   an axially moveable tile carrier defining a radial sealing surface for forming, with a further radial sealing surface, a radial seal to separate internal and external pressure areas and an axially sealing surface cooperating with an axially slidable seal to separate internal and external pressure areas whereby a radial location of the seal is selected such that the pressure applied by the internal and external pressure areas to the radial sealing surface is substantially balanced by at least the internal and external pressures applied to respective pressure-balancing surfaces opposing the radial sealing surface; and
   a piston ring between the sealing surface and the seal, wherein the tile carrier is provided with a cylindrical sliding surface containing a groove into which is fitted a piston sealing ring, the sliding surface and the piston sealing ring cooperating with a cylindrical bore formed in a seal static back member such that the cylindrical bore together with the cylindrical surface and the tile carrier define a closed annular space, the apparatus further including a valve for venting the enclosed gas space.

2. Apparatus as claimed in claim 1 wherein the frusto-conical surface is part of a right circular cone.

3. Apparatus as claimed in claim 1 wherein the surfaces engage at the point of closest engagement when the portions are not rotating relative to each other.

4. Apparatus as claimed in claim 1 wherein the second portion includes the carrier and at least one tile element mounted on the carrier to define the flat surface.

5. Apparatus as claimed in claim 4 wherein the or each tile element is pivotably mounted on the carrier.

6. Apparatus as claimed in claim 5, wherein the biasing device deflects the tile element into contact with the first portion when the first portion ceases to rotate.

7. Apparatus as claimed in claim 6, further including a rotating face seal that is at least partially formed of or coated with an abradable material so that in the event of a tile failure the unbalanced forces drive cutting blades on the tile carrier into contact with the material so that it is abraded away, thereby preventing contact between the pressure-balancing surface and the radial sealing surface.

8. Apparatus as claimed in claim 6, wherein the tile carrier is at least partially formed of or coated with an abradable material so that in the event of a tile failure the unbalanced forces drive cutting blades on the rotating face seal into the abdradable material, the material being abraded away, thereby preventing contact between pressure-balancing surface and the radial sealing surface.

9. Apparatus as claimed in claim 1, wherein the second portion defines a plurality of spaced substantially flat surfaces arranged circumjacent the frusto-conical surface to define respective points of closest engagement and associated gaps, the apparatus further including a plurality of said biasing devices, each said biasing device being associated with a respective said flat surface.

10. Apparatus as claimed in claim 1 wherein the surfaces are relatively positioned in a direction of relative rotation such that torques generated on the flat surface by entrained gas are balanced about the point or points of closet engagement.

11. Apparatus as claimed in claim 1 including a mechanism for rotating the first and/or the second portion.

12. Apparatus as claimed in claim 1 wherein the first portion and/or the second portion is formed of or coated by a ceramic material.

13. Apparatus as claimed in claim 1 wherein the generally frusto-conical surface is concave or convex.

14. Apparatus as claimed in claim 1 wherein the biasing device includes a wave spring, a thrust bearing and/or a set of coil springs.

15. Apparatus as claimed claim 1, further including a third portion defining at least one flat surface disposed adjacent a further frusto-conical surface on the first portion and substantially opposite the second portion such that forces generated by the second and third portions are substantially equal and opposite.

16. Apparatus as claimed in claim 1, further including a thrust connection for transmitting thrust, but not rotation.

17. Apparatus as claimed in claim 16, wherein the first portion is connected to or provides a first sealing surface, and the second portion is connected to or provides a second sealing surface which forms a seal with the first sealing surface.

18. Apparatus as claimed in claim 17, wherein the second sealing surface is located within a housing having a ring, the second sealing surface being slidable on the ring so that it can be brought in and out of contact with the first sealing surface.

19. Apparatus as claimed in claim 18, wherein the biasing device is or includes an axial wave spring housed in a recess.

20. Apparatus as claimed in claim 18, wherein the ring includes an upstand portion for retaining the components of the seal together in a preassembled condition.

21. Apparatus as claimed in claim 20, wherein the upstand portion forms an air dam.

22. Apparatus as claimed in claim 1, wherein venting of the enclosed gas space causes the tile carrier to withdraw from engagement with the further radial sealing surface.

23. The apparatus as claimed in claim 1, wherein a cone angle is formed between the frusto-conical surface and the flat surface said cone angle is between 0.3 to 1.0 degrees.

* * * * *